(12) United States Patent
Kinoshita

(10) Patent No.: US 9,129,175 B2
(45) Date of Patent: Sep. 8, 2015

(54) RECORDING MEDIA PROCESSING DEVICE, CONTROL METHOD OF A RECORDING MEDIA PROCESSING DEVICE, AND COMPUTER-READABLE RECORDING MEDIUM

(71) Applicant: Seiko Epson Corporation, Tokyo (JP)

(72) Inventor: Yoshiaki Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 288 days.

(21) Appl. No.: 13/911,545

(22) Filed: Jun. 6, 2013

(65) Prior Publication Data

US 2013/0329983 A1    Dec. 12, 2013

(30) Foreign Application Priority Data

Jun. 8, 2012   (JP) .................................. 2012-130485

(51) Int. Cl.
*G06K 9/00* (2006.01)
*G06K 7/14* (2006.01)
*G06K 9/18* (2006.01)

(52) U.S. Cl.
CPC .............. *G06K 7/1404* (2013.01); *G06K 9/186* (2013.01)

(58) Field of Classification Search
None
See application file for complete search history.

(56) References Cited

U.S. PATENT DOCUMENTS

2008/0285839 A1*  11/2008  Nakamura .................... 382/139

FOREIGN PATENT DOCUMENTS

| JP | 2004-206362 | * | 7/2004 | ................ G06T 1/00 |
| JP | 2004-206362 A | | 7/2004 | |

* cited by examiner

*Primary Examiner* — Amara Abdi
(74) *Attorney, Agent, or Firm* — Nutter McClennen & Fish LLP; John J. Penny, Jr.

(57) ABSTRACT

The character recognition unit 80 detects a first peak P1 in acquired signal waveform data, extracts character waveform data in the area of one magnetic ink character 101 in a MICR line 100 based on the position of the first peak P1, and acquires a recognition string by applying a magnetic recognition process to the character waveform data and recognizing the magnetic ink characters 101. When the first peak P1 in the character waveform data of a target character located at an end of the recognition string is within a specific range from an end of the character waveform data and a space is beside the target character, and when a space is on both sides of the target character in the recognition string, the character recognition unit 80 determines if the target character is noise.

9 Claims, 10 Drawing Sheets

BOLD LINE: REFERENCE WAVEFORM DATA
THIN LINE: CHARACTER WAVEFORM DATA

RECORDING MEDIA PROCESSING DEVICE, CONTROL METHOD OF A RECORDING MEDIA PROCESSING DEVICE, AND COMPUTER-READABLE RECORDING MEDIUM

BACKGROUND

1. Technical Field

The present invention relates to a recording media processing device, a method of controlling a recording media processing device, and a computer-readable recording medium.

2. Related Art

Recording media processing devices (check readers) that have a magnetic head for reading a magnetic ink character line (MICR line) recorded on checks and similar recording media, read the magnetic ink characters contained in the MICR line of the recording medium conveyed through a conveyance path, and recognize each magnetic ink character are known from the literature. See, for example, Japanese Unexamined Patent Appl. Pub. JP-A-2004-206362.

Such recording media processing devices identify (read) each character in the MICR line by magnetic ink character recognition, a process of extracting character waveform data in a range corresponding to one magnetic ink character from the signal waveform data obtained by reading the MICR line, and comparing the extracted character waveform data with reference waveforms for the characters defined by a particular standard to recognize each magnetic ink character.

However, magnetic ink overspray is found beside the MICR line on some recording media obtained through normal distribution channels. Multiple checks or other recording media of this type may also be printed on large-format paper with cutting lines printed in magnetic ink to identify where to cut the large-format paper into individual checks, for example, and a cutting line may sometimes be left along the edge of individual recording media after cutting. If magnetic ink overspray or cutting lines are read together with the MICR line, and noise caused by the overspray or cutting line is accidentally extracted as part of the character waveform data, character recognition may not be possible or the noise may be wrongly recognized as a character.

SUMMARY

The present invention is directed to solving at least part of the foregoing problem, and provides a recording media processing device, control method, and computer-readable recording medium as described below.

A recording media processing device according to one aspect of the invention has a magnetic reading unit that magnetically reads a magnetic ink character line recorded on a recording medium; and a character recognition unit that detects the first peak in signal waveform data acquired by the magnetic reading unit reading the magnetic ink character line, extracts character waveform data from the signal waveform data in an area corresponding to one magnetic ink character contained in the magnetic ink character line based on the position of the detected first peak, applies a magnetic recognition process to the extracted character waveform data to recognize the magnetic ink character, and acquires a recognition string corresponding to the magnetic ink character line. When the first peak in the character waveform data of a target character located at an end of the recognition string is within a specific range from an end of the character waveform data and a space is beside the target character, or when a space is on both sides of the target character in the recognition string, the character recognition unit determines if the target character is noise.

When the space equal to approximately one character width beside a target character located at an end of the recognition string is blank, the possibility is high that noise due to ink overspray or cutting line separated from the magnetic ink character line near an end of the recording medium was erroneously extracted as a target character. When the space equal to approximately one character width is blank on both sides of a target character in the recognition string, the possibility is high that noise due to isolated ink overspray within the magnetic ink character line was erroneously extracted as a target character. The character recognition unit in this aspect of the invention determines if such target characters are noise, and can thereby identify noise due to ink overspray or cutting line as an unrecognizable character, and suppress mistakenly recognizing the noise as a valid character. The recognition rate can therefore be improved and recognition errors suppressed.

In a recording media processing device according to another aspect of the invention, the character recognition unit determines if there are two first peaks in the character waveform data of the target character when the target character is recognized as the number 3, and determines the target character is noise if there are not two first peaks in the character waveform data of the target character.

When character recognition is erroneously applied to noise as the target character, the target character may be mistakenly recognized as the number 3 (as described in detail below). The character waveform data for the number 3 characteristically has two first peaks in the waveform. Therefore, when a character with adjacent space at an end of the recognition string, or a character with white space on both sides, is recognized as the number 3 and the character does not have two first peaks, the likelihood that the character was erroneously recognized noise is extremely high. Because the character recognition unit in this aspect of the invention determines that such target characters are noise, noise due to ink overspray or cutting line can be identified as an unrecognizable character, and mistakenly recognizing noise as a valid character can be suppressed.

In a recording media processing device according to another aspect of the invention, the character recognition unit detects a peak before and after the first peak in the signal waveform data, and determines the first peak is noise if a peak equal to or exceeding a specific level is not detected within a specific range before and after the first peak.

Character waveform data for magnetic ink characters characteristically has plural peaks equal to or exceeding a specific level. Therefore, if a peak equal to or exceeding a specific level is not within a specific range before and after the first peak, the possibility that the first peak is not from a magnetic ink character but is noise due to ink overspray or cutting line is extremely high. This aspect of the invention determines that the first peak is noise in this event, and can therefore detect the first peak in the magnetic ink character again and correctly extract the character waveform data.

In a recording media processing device according to another aspect of the invention, the character recognition unit first detects a peak equal to or exceeding the specific level on the side after the first peak in the reading direction.

Ink overspray and cutting lines are usually not present on the recording medium. The character waveform data for magnetic ink characters also has a peak equal to or exceeding the specific level after the first peak in the reading direction. This aspect of the invention first detects a peak in a specific range after the first peak, and processing is therefore faster than when peak detection is first applied before the first peak.

Another aspect of the invention is a control method of a recording media processing device having a magnetic reading unit that magnetically reads a magnetic ink character line recorded on a recording medium, and a character recognition unit that detects the first peak in signal waveform data acquired by the magnetic reading unit reading the magnetic ink character line, extracts character waveform data from the signal waveform data in an area corresponding to one magnetic ink character contained in the magnetic ink character line based on the position of the detected first peak, applies a magnetic recognition process to the extracted character waveform data to recognize the magnetic ink character, and acquires a recognition string corresponding to the magnetic ink character line. The control method includes a step of: the character recognition unit determining if the target character is noise when the first peak in the character waveform data of a target character located at an end of the recognition string is within a specific range from an end of the character waveform data and a space is beside the target character, or when a space is on both sides of the target character in the recognition string.

When there is a space beside a target character located at an end of the recognition string, the possibility is high that noise due to ink overspray or cutting line separated from the magnetic ink character line near an end of the recording medium was erroneously extracted as a target character. When there is a space on both sides of a target character in the recognition string, the possibility is high that noise due to isolated ink overspray within the magnetic ink character line was erroneously extracted as a target character. This control method has a step in which the character recognition unit determines if such target characters are noise, and can thereby identify noise due to ink overspray or cutting line as an unrecognizable character, and suppress mistakenly recognizing the noise as a valid character.

Another aspect of the invention is a computer-readable recording medium storing a program executed by a control unit that controls parts of a recording media processing device having a magnetic reading unit that magnetically reads a magnetic ink character line recorded on a recording medium, and a character recognition unit that detects the first peak in signal waveform data acquired by the magnetic reading unit reading the magnetic ink character line, extracts character waveform data from the signal waveform data in an area corresponding to one magnetic ink character contained in the magnetic ink character line based on the position of the detected first peak, applies a magnetic recognition process to the extracted character waveform data to recognize the magnetic ink character, and acquires a recognition string corresponding to the magnetic ink character line. The program causes the control unit to execute a step of determining if the target character is noise when the first peak in the character waveform data of a target character located at an end of the recognition string is within a specific range from an end of the character waveform data and a space is beside the target character, or when a space is on both sides of the target character in the recognition string.

When there is a space beside a target character located at an end of the recognition string, the possibility is high that noise due to ink overspray or cutting line separated from the magnetic ink character line near an end of the recording medium was erroneously extracted as a target character. When there is a space on both sides of a target character in the recognition string, the possibility is high that noise due to isolated ink overspray within the magnetic ink character line was erroneously extracted as a target character. The program according to this aspect of the invention has a step in which the character recognition unit determines if such target characters are noise, and can thereby identify noise due to ink overspray or cutting line as an unrecognizable character, and suppress mistakenly recognizing the noise as a valid character.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of a recording media processing device, a method of controlling the recording media processing device, and a computer-readable recording medium according to the present invention are described below with reference to the accompanying figures. A recording media processing device according to this embodiment of the invention is a device that recognizes a string of magnetic ink characters printed on the MICR line of a recording medium in order to verify the validity of the recording medium, which in this embodiment is a business or personal check.

Check

Figure 1:
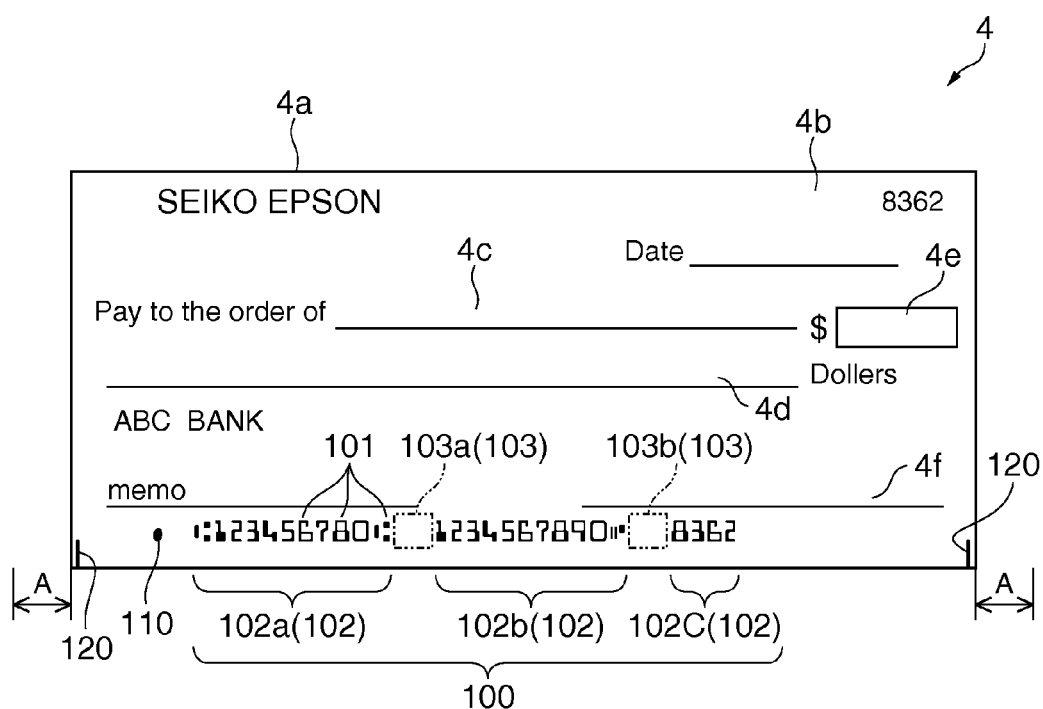
FIG. 1 shows a check on which a MICR line is printed.

A check 4 used as an example of the recording medium in this embodiment is described first. FIG. 1 shows an example of a check on which a MICR line is printed. As shown in FIG. 1, the check 4 has a date field 4b, payee field 4c, amount fields 4d and 4e, and a signature line 4f on the front 4g of the check form 4a. The check form 4a is a cut-sheet medium. Note that fields 4b to 4f are still empty in FIG. 1. An MICR line 100 containing multiple magnetic ink characters 101 expressing the bank number, account number, and check number is printed along the bottom of the check form 4a. An endorsement area is provided on the back 4h of the check 4 (see FIG. 2).

The MICR line 100 includes plural fields 102 (102a, 102b, 102c) delimited by space characters 103 (103a, 103b). Each of the fields 102a, 102b, 102c is a continuous string of magnetic ink characters 101, and in this example correspond from the left to the bank number, account number, and check number.

The magnetic ink characters 101 are characters magnetically printed on the check 4 using a specific font (such as the E-13B font), and any one magnetic ink character 101 corresponds to one of plural predefined characters. The E-13B font has 14 magnetic ink character 101 shapes including the numbers 0 to 9, a transit symbol, amount symbol, On-Us symbol, and a dash symbol.

The MICR line 100 may be printed on the check 4 by offset printing or laser printing process. The actual shapes of the magnetic ink characters 101 in the E-13B font produced by offset printing, and the magnetic ink characters 101 in the E-13B font produced by laser printing, may differ.

As indicated by the imaginary lines in FIG. 1, a space character 103a is placed between fields 102a and 102b, and a space character 103b is placed between fields 102b and 102c. These space characters 103 (103a, 103b) are recognized as space characters by the check reader 1. The space characters 103 (103a, 103b) may also occupy the width of one or multiple magnetic ink characters 101.

Using a check 4 for a business transaction is described briefly next. The buyer of some product writes the date, payee, amount (in numbers and words), and signature in the fields 4b, 4c, 4d, 4e, 4f of the check form 4a, and then presents the check 4 to the payee. The payee then reads the MICR line 100 with the check reader 1 (see FIG. 2), and determines the validity of the check 4 by verifying the recognized data with a specific institution.

If check 4 validity is confirmed, endorsement information is recorded on the back of the check 4. This endorsement information may be written by hand, stamped, or printed with a printer. The amount may then be printed on the endorsed check 4 in a MICR line 100 of magnetic ink characters 101 on the right by the payee, bank, or payment processing center. The check 4 is then processed through the settlement system of the bank, and the amount specified in the MICR line 100 is remitted to the endorsing payee. Reading the MICR line 100 and accurate character recognition are therefore required for check 4 processing.

Ink overspray 110 where ejected ink lands can also occur when printing the MICR line 100 with magnetic ink on a check form 4a. When plural check forms 4a are printed on large-format paper, cutting lines 120 may also be printed with magnetic ink to indicate where to cut the paper into individual check forms 4a, and a cutting line 120 may be left at the left or right end of a check form 4a after the paper is cut. The cutting lines 120 are printed outside the area where the MICR line 100 is printed, and the cutting lines 120 may be read together with the MICR line 100 when the reading area of the magnetic head 54 (see FIG. 3) is wide. Ink overspray 110 or cutting lines 120 on the check 4 can reduce the recognition rate or cause recognition errors during magnetic character recognition of the MICR line 100 as described below.

Recording Media Processing Device

A recording media processing device according to this embodiment of the invention is described next. A recording media processing device according to this embodiment of the invention includes a check reader 1 and host computer 70.

Figure 2:
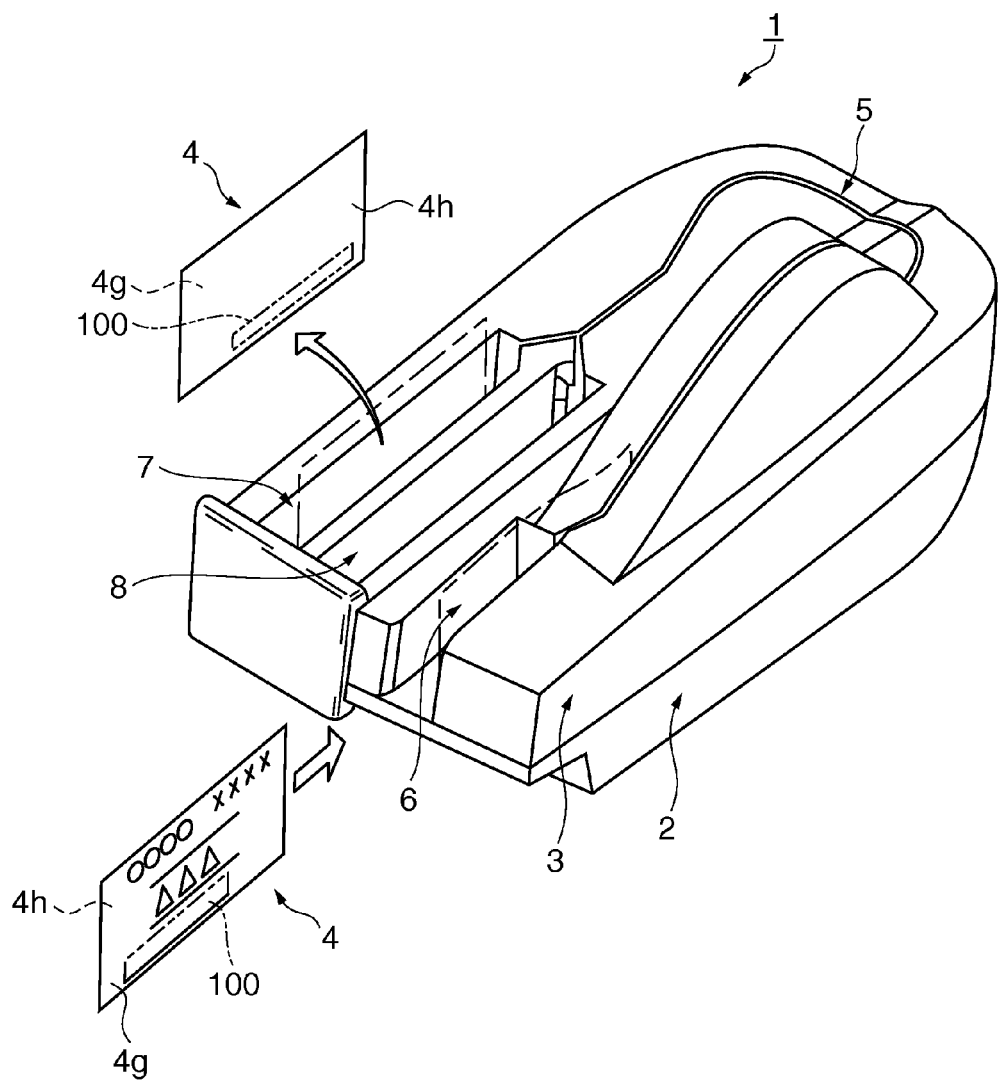
FIG. 2 is an oblique view of a check reader according to a preferred embodiment of the invention.

The basic configuration of a check reader 1 according to this embodiment of the invention is described first. FIG. 2 is an oblique view of the check reader 1 according to this embodiment of the invention. This check reader 1 is a device that processes checks 4, including reading magnetic ink characters recorded on a check 4, scanning both sides of the check 4, and recording a specific image in the endorsement area of the check 4.

The check reader 1 has a bottom case 2, and a cover case 3 covering the top of the bottom case 2, and other components assembled inside. A check 4 conveyance path 5 is formed inside the cover case 3 as a narrow vertical channel that is U-shaped when seen from above. One end of the conveyance path 5 communicates with a check supply unit 6 formed as a wide vertical hopper, and the other end of the conveyance path 5 splits left and right into first check discharge unit 7 and second check discharge unit 8, both of which are also wide vertical pockets.

Checks 4 are inserted to the check supply unit 6 with the top and bottom edges aligned so that the top edges (up in FIG. 1) are up and the bottom edges (down in FIG. 1) down, and the front and back sides matched so that the front 4g faces the outside of the U-shaped conveyance path 5 (as shown in FIG. 2). The checks 4 inserted to the check supply unit 6 are conveyed through the conveyance path 5 with the right edge shown in FIG. 1 as the leading end.

As a check 4 fed from the check supply unit 6 is conveyed through the conveyance path 5, a front image, which is an image of the front 4g, and a back image, which is an image of the back 4h, are scanned, and the MICR line 100 recorded on the front 4g is magnetically read. Checks 4 from which the MICR line 100 is successfully read are then discharged into the first check discharge unit 7 after a specific endorsement image is recorded thereon.

Checks 4 from which reading the MICR line 100 failed are then discharged into the second check discharge unit 8 without recording the specific endorsement image. A check 4 discharged into the second check discharge unit 8 may then be examined to determine why reading failed, or scanned again, for example.

Figure 3:
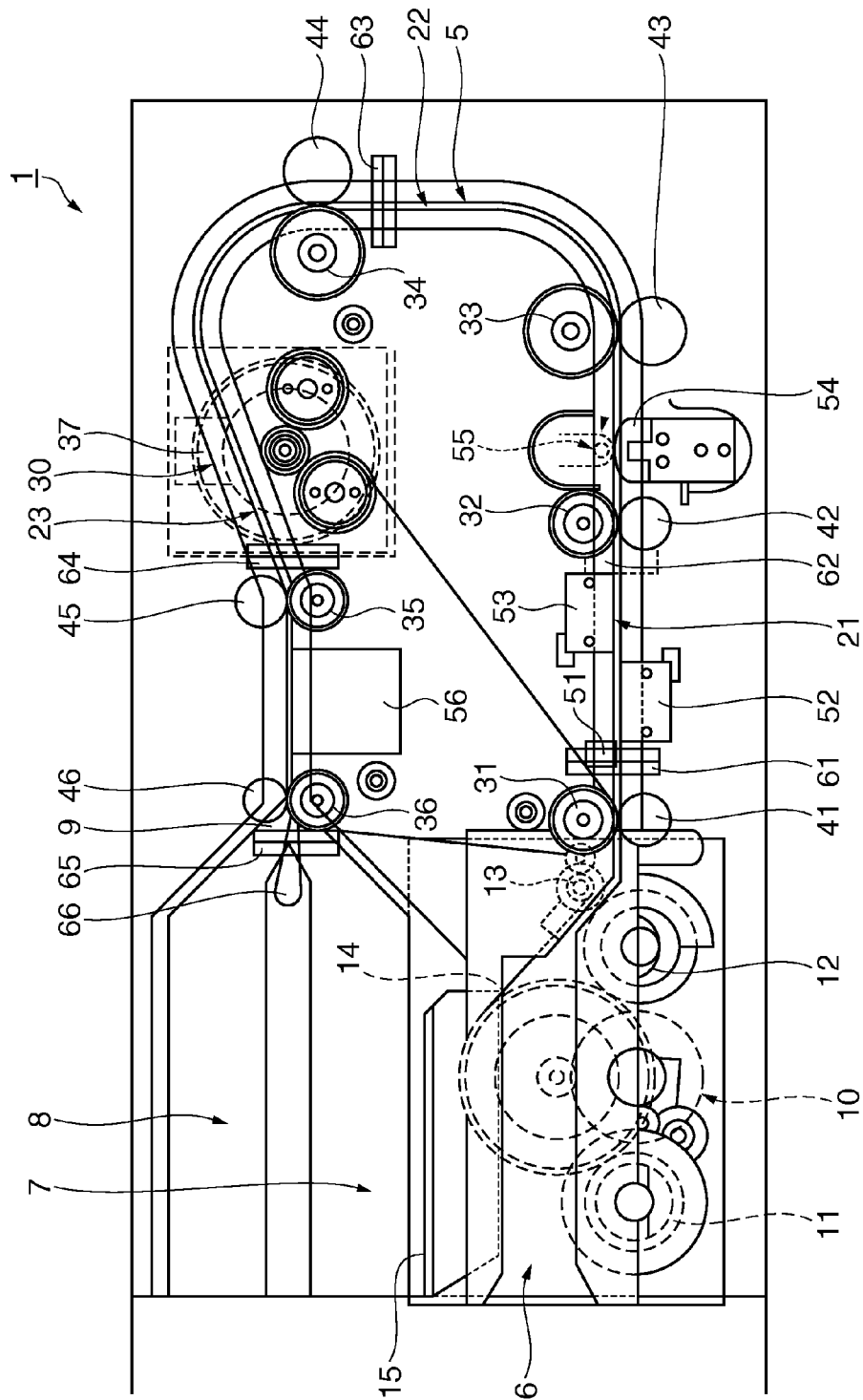
FIG. 3 shows the internal structure of the check reader.

FIG. 3 shows the internal structure of the check reader 1. The check supply unit 6 has a check feed mechanism 10 for feeding checks 4 (see FIG. 2) into the conveyance path 5. The check feed mechanism 10 includes a delivery roller 11, feed roller 12, retard roller 13 pressed against the feed roller 12, a paper feed motor 14, and a check-pressing hopper 15.

When the paper feed motor 14 drives, the checks 4 loaded in the check supply unit 6 are pressed by the check-pressing hopper 15 to the delivery roller 11 side, and the delivery roller 11 and feed roller 12 are then driven synchronously.

The check 4 is then fed between the feed roller 12 and retard roller 13 by the delivery roller 11. A specific rotational load is applied to the retard roller 13, and only the one check 4 directly contacting the feed roller 12 is separated from the other checks 4 and fed into the conveyance path 5.

The conveyance path 5 is U-shaped as described above, and has a straight upstream conveyance path portion 21 connected to the check supply unit 6, a downstream conveyance path portion 23 that curves slightly and connects to the first check discharge unit 7 and second check discharge unit 8, and a curved conveyance path portion 22 that connects the upstream conveyance path portion 21 and downstream conveyance path portion 23.

A check conveyance mechanism 30 conveys checks 4 fed into the conveyance path 5 from the check supply unit 6 through the conveyance path 5. The check conveyance mechanism 30 includes first to sixth conveyance rollers 31 to 36, first to sixth pressure rollers 41 to 46 that are pressed against and rotate in unison with the opposing conveyance rollers, and a conveyance motor 37 that rotationally drives the first to sixth conveyance rollers 31 to 36.

The first to sixth conveyance rollers 31 to 36 rotate synchronously. A stepper motor, for example, is used as the conveyance motor 37. The conveyance distance of a check 4 can therefore be known from the number of steps the stepper motor is driven.

The first to third conveyance rollers 31 to 33 are disposed at the upstream end and middle of the upstream conveyance path portion 21, and at the junction to the curved conveyance path portion 22. The fourth conveyance roller 34 is disposed to the downstream end of the curved conveyance path portion 22.

The fifth and sixth conveyance rollers 35, 36 are disposed in the middle and downstream end of the downstream conveyance path portion 23.

A magnet 51 for magnetizing magnetic ink characters, a front contact image sensor 52, and a back contact image sensor 53 are disposed in order from the upstream end of the upstream conveyance path portion 21 between the first conveyance roller 31 and second conveyance roller 32. The MICR line 100 recorded on a check 4 is magnetized by the magnet 51.

The front contact image sensor 52 scans a front image, which is an image of the front 4g, from the front 4g of the check 4 conveyed through the conveyance path 5. The back contact image sensor 53 scans a back image, which is an image of the back 4h, from the back 4h of the check 4 conveyed through the conveyance path 5.

A magnetic head 54 is disposed as a magnetic reading unit that reads the magnetic ink characters 101 between the second conveyance roller 32 and third conveyance roller 33. The magnetic head 54 magnetically reads the MICR line 100 by detecting change in the magnetic flux density of the magnetized MICR line 100 at a specific sampling period to acquire signal waveform data.

A pressure plate 55 that presses the check 4 against the magnetic head 54 is disposed opposite the head. A recording device 56 for recording a specific endorsement image is disposed to the downstream conveyance path portion 23 between the fifth conveyance roller 35 and sixth conveyance roller 36. The recording device 56 includes a printhead, stamp, or other means capable of recording a specific image in an appropriate direction at a suitable position on the back 4h of the check 4 conveyed through the conveyance path 5.

Various sensors for controlling check conveyance are also disposed to the conveyance path 5. A paper length detector 61 for detecting the length of the conveyed check 4 is disposed at a position before the magnet 51. A multifeed detector 62 for detecting if checks 4 are multifed is disposed between the back contact image sensor 53 and the second conveyance roller 32. A jam detector 63 is disposed at a position before the fourth conveyance roller 34, and a paper jam resulting from the check 4 being stuck in the conveyance path 5 is detected when a check 4 is detected continuously for at least a specific time by the jam detector 63.

A printing detector 64 for detecting the presence of a check 4 to be endorsed by the recording device 56 is disposed at a position before the fifth conveyance roller 35. A discharge detector 65 is disposed at a position downstream from the sixth conveyance roller 36, that is, at the junction 9 where the conveyance path 5 branches to the first check discharge unit 7 and second check discharge unit 8, to detect discharged checks 4.

A flapper 66 that is operated by a drive motor 67 (see FIG. 4) is disposed to the junction 9. The flapper 66 selectively communicates the downstream end of the conveyance path 5 with the first check discharge unit 7 or second check discharge unit 8, and guides the check 4 into the selected discharge unit.

Figure 4:
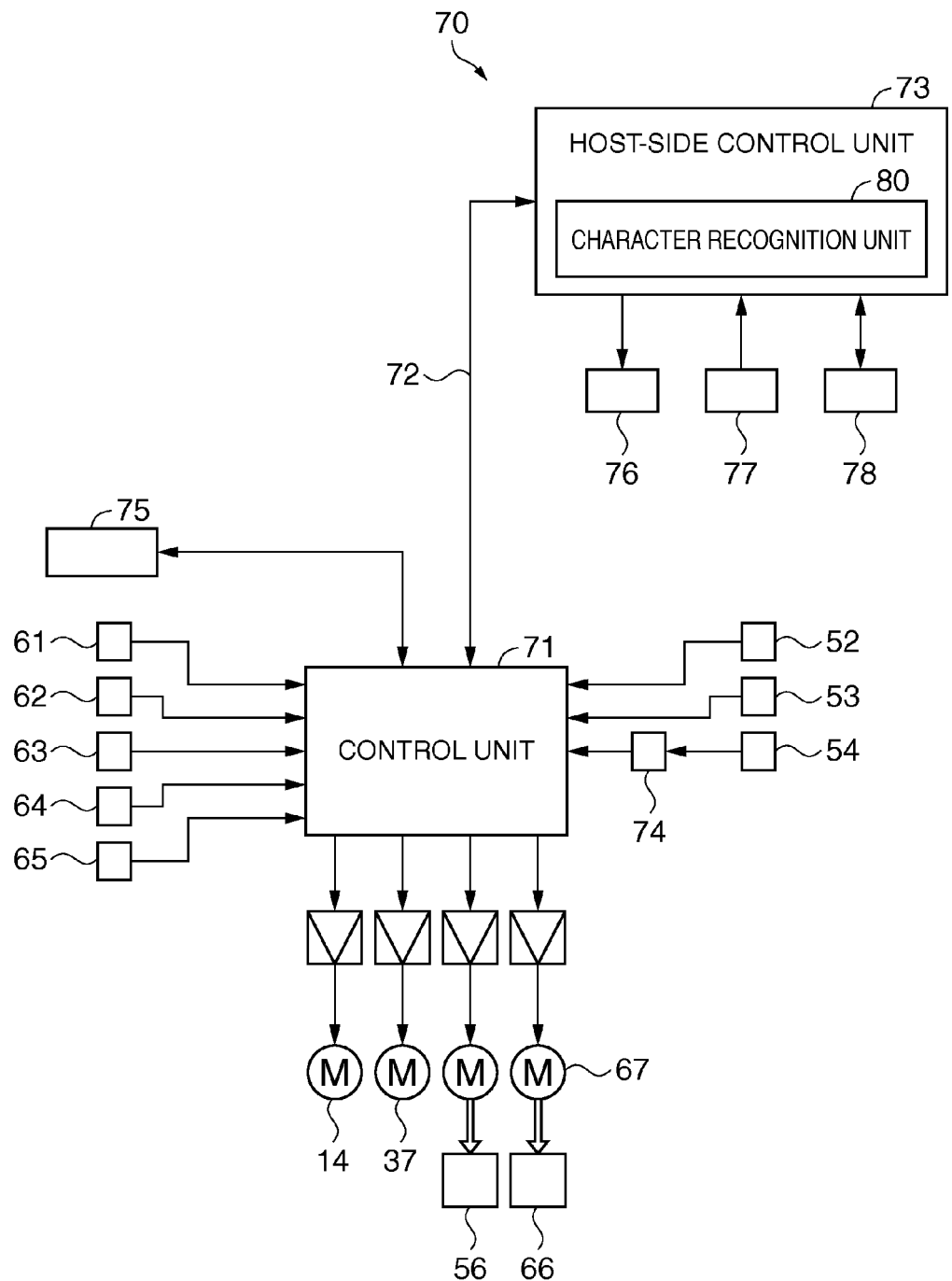
FIG. 4 is a block diagram showing the functional configuration of the check reader.

FIG. 4 is a block diagram showing the functional configuration of the check reader 1. A control unit 71 centrally controls other parts of the check reader 1 as controlled by the host-side control unit 73 of the host computer 70 described below, and includes a CPU, RAM, ROM, and other peripheral circuits.

As controlled by the host-side control unit 73, the control unit 71 drives the paper feed motor 14 and conveyance motor 37 to feed the checks 4 one at a time into the conveyance path 5 (FIG. 2), and convey the supplied check 4 through the conveyance path 5. Conveyance control of a check 4 by the control unit 71 is based on detection signals from the paper length detector 61, multifeed detector 62, jam detector 63, printing detector 64, and discharge detector 65 disposed to the conveyance path 5.

As a check 4 is conveyed, the front contact image sensor 52 and back contact image sensor 53 scan front and back images of the check 4 conveyed through the conveyance path 5, and output image data for the captured images to the control unit 71. The control unit 71 outputs this image data to the host-side control unit 73.

The magnetic head 54 detects the electromagnetic force produced by change in the magnetic field created by the passing MICR line 100 (FIG. 1) as controlled by the control unit 71, and outputs the resulting detection signal to a signal processing circuit 74.

The signal processing circuit 74 includes an amplifier, filter for removing noise, and A/D converter, amplifies and waveshapes the detection signal input from the magnetic head 54, and outputs the resulting data to the control unit 71. The control unit 71 sends data describing the detection signal input from the signal processing circuit 74 to the host-side control unit 73.

An operating unit 75 includes switches such as a power switch and operating switches disposed to the bottom case 2 (FIG. 2), detects user operation of these switches, and outputs to the control unit 71.

A host computer 70 is connected to the check reader 1 through a communication cable 72. The host computer 70 has a host-side control unit 73 including a CPU, RAM, ROM, and other peripheral circuits. The host-side control unit 73 includes a character recognition unit 80 described below.

Connected to the host-side control unit 73 are a display 76 for displaying information, an operating unit 77 to which input devices such as a keyboard and mouse are connected, and a storage unit 78 such as an EEPROM or hard disk device capable of storing data rewritably. The storage unit 78 stores the front and back images of the checks 4 input from the check reader 1, and detection signal data.

In this embodiment of the invention the control unit 71 of the check reader 1 controls parts of the check reader 1 as controlled by the host-side control unit 73 of the host computer 70. More specifically, the host-side control unit 73 controls parts of the check reader 1 by the CPU of the control unit 73 running a program stored in ROM, generating control data for controlling the control unit 71, and outputting the resulting control data to the control unit 71 of the check reader 1. More specifically, the host computer 70 and check reader 1 in this embodiment of the invention cooperate to function as a recording media processing device for processing checks 4 as the recording medium.

Character Recognition Unit

The character recognition unit 80 of the host-side control unit 73 is described next. The function of the character recognition unit 80 is achieved by the cooperation of hardware and software, such as the CPU of the host-side control unit 73 running a program stored in ROM.

The character recognition unit 80 applies a character recognition process to each magnetic ink character 101 in the MICR line 100. Character recognition refers to identifying (recognizing) each magnetic ink character 101 in the magnetic ink characters 101 that were read, or determining that the magnetic ink character 101 cannot be identified (recognized).

If all of the magnetic ink characters 101 in the MICR line 100 can be recognized, this embodiment determines that reading the MICR line 100 succeeded. Reading the MICR line 100 fails if there is even only one magnetic ink character 101 that cannot be recognized.

In this embodiment, the MICR line 100 recorded on a check 4 is read by the magnetic head 54 as the check 4 travels through the conveyance path 5 as described above. The MICR line 100 is read by the magnetic head 54 detecting change in the magnetic flux density of the MICR line 100 on the conveyed check 4 at a specific sampling period from the right end (the right in FIG. 1) to the left end (the left in FIG. 1).

Figure 5A:
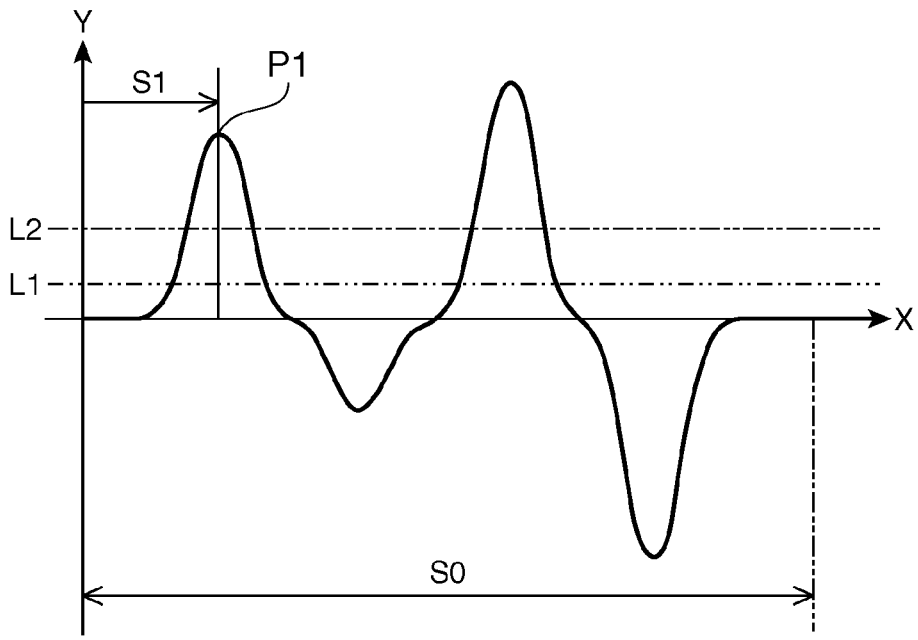
FIG. 5A and FIG. 5B show an example of character waveform data.
Figure 5B:
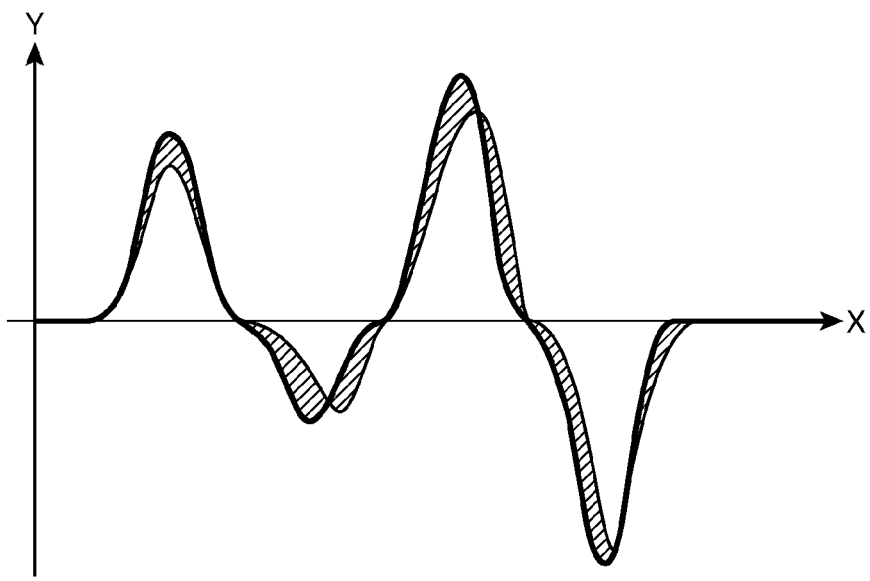

FIG. 5 shows an example of character waveform data. More specifically, FIG. 5A shows the character waveform data for one magnetic ink character, and FIG. 5B describes the difference between the character waveform data and reference waveform data.

Reading with the magnetic head 54 produces a continuous waveform such as shown in FIG. 5A for one character as the signal waveform data representing one magnetic ink character in the MICR line 100. Below, the shortest interval in the sampling period is one sampling unit, and seven sampling units are referred to as one mesh.

The character recognition unit 80 applies processes including extracting and normalizing character waveform data for one character to the acquired signal waveform data. Extracting character waveform data refers to generating character waveform data such as shown in FIG. 5A for each magnetic ink character 101 in the MICR line 100 based on the signal waveform data acquired by reading the MICR line 100.

The passage of time (sampling period) is shown on the x-axis (horizontal axis) in FIG. 5A, and the sampling units pass sequentially to the right from the origin along the x-axis. The y-axis (vertical axis) shows the relative change in magnetic flux density over time, the amplitude of the character waveform data (change in the direction of the y-axis) is divided into 256 levels, and level 128 is at the origin (0 level)

Relative change in magnetic flux density during a specific sampling period is shown in FIG. 5A from the origin to the right on the x-axis. The value on the y-axis moves up or down according to the change in the magnetic flux density of the magnetic ink character 101, and the value on the y-axis goes positive or negative according to whether the change in the magnetic flux density is positive or negative.

As shown in FIG. 5A, the period S0 on the x-axis occupied by character waveform data for one character is defined as a specific number of sampling units, and media conveyance is controlled and the length of one sampling unit is defined accordingly. Period S0 is also defined so that first peak P1, which is the first peak detected, is at specific period S1 from the start of character extraction in the character waveform data for one character.

In this embodiment the period S0 occupied by the waveform for one character is 70 sampling units (10 mesh) and the specific period S1 is 11 sampling units, for example. The character recognition unit 80 then analyzes the signal waveform data, and of the waveform peaks exceeding a specific level L1, detects the first peak P1 that appears from the origin to the end of the waveform (right on the x-axis) as the first peak.

A peak is a high or low point in the signal waveform data, and these peaks appear at a specific period along the x-axis. Peaks on the positive side are called positive peaks, and peaks on the negative side are called negative peaks. The value on the x-axis corresponding to each peak is called the position (level) of the peak. The character waveform data of each of the 14 magnetic ink characters 101 has plural positive peaks and negative peaks.

For each magnetic ink character 101 in the MICR line 100, the character recognition unit 80 determines the start character extraction position so that the position of the detected first peak P1 is at the eleventh sampling unit on the x-axis of the extracted waveform. The character recognition unit 80 then extracts the character waveform data in the 70 sampling units (10 mesh) occupied by the waveform for one character from this start character extraction position. The magnetic ink character 101 corresponding to the character waveform data extracted for one character is referred to below as the target character.

The character recognition unit 80 then normalizes the extracted character waveform data so that the amplitude levels on the y-axis coincide with the reference waveform data for pattern matching shown by the bold line in FIG. 5B. The reference waveform data is template data for the ideal waveform resulting from the magnetic head 54 reading a magnetic ink character 101 corresponding to one of the fourteen MICR characters.

The character recognition unit 80 then recognizes each of the magnetic ink characters 101 in the MICR line 100 from the extracted character waveform data based on specific recognition conditions. The magnetic ink character 101 recognition process either identifies the magnetic ink character 101 that was read, or determines that character recognition is not possible. Character recognition is further described below.

The character recognition unit 80 then compares the normalized character waveform data indicated by the thin line in FIG. 5B with reference waveform data for each character, and detects the difference therebetween. This difference is the size of the shaded area in FIG. 5B, and more specifically is the sum of the absolute values of the y-axis value of the waveform described by the character waveform data (waveform value), and the y-axis value of the waveform described by the reference waveform data.

The smaller the difference between the character waveform data for one character and the reference waveform data for the same character, the closer the resemblance between the waveform represented by the character waveform data and the waveform represented by the reference waveform data, and the greater the probability that the magnetic ink character 101 described by the character waveform data is the character described by the reference waveform data.

After calculating the difference between the character waveform data for the one character and all 14 MICR characters, the character recognition unit 80 selects the character corresponding to the reference waveform data with the smallest difference as a first candidate, and the character corresponding to the reference waveform data with the next-smallest difference as a second candidate. The character recognition unit 80 then compares the difference between the character waveform data and the reference waveform data for the characters selected as the first candidate and second candidate with a specific threshold.

As a result of comparing the differences with the specific threshold, if the difference between the character waveform data and the reference waveform data selected as the first candidate is less than or equal to the threshold, and the difference between the character waveform data and the reference waveform data selected as the second candidate is greater than the threshold, the specific magnetic ink character 101 is considered recognized and the character selected as the first candidate is used as the recognized character resulting from character recognition.

The threshold used for magnetic recognition is set appropriately so that only the difference between the character waveform data and the reference waveform data for the correct character is less than or equal to the specific threshold, and the difference between the character waveform data and the reference waveform data for all other characters exceeds the threshold. As a result, if the difference with the first candidate exceeds the threshold, or there are plural characters resulting in a difference less than or equal to the threshold, an error such as a read error with the magnetic head 54 or a check 4 conveyance error may have occurred resulting in a recognition error, and recognition is determined not possible.

The string corresponding to the MICR line 100 obtained by applying character recognition to each of the magnetic ink characters 101 is called the recognition string. The recognition string includes the successfully recognized characters, and the characters that could not be recognized.

If there is magnetic ink overspray 110 (see FIG. 1) on the check 4, the ink overspray 110 is also magnetized with the MICR line 100 and read by the magnetic head 54. When this happens, noise caused by the ink overspray 110 is contained in the acquired signal waveform data. If the noise caused by ink overspray 110 is mistakenly extracted as character waveform data from the signal waveform data, the character recognition process will be applied to the character waveform data for the noise, and recognition may not be possible. More specifically, the ink overspray 110 is also handled as a magnetic ink character 101 in the character recognition process, and may be output as a character that cannot be recognized.

If a cutting line 120 (FIG. 1) printed in magnetic ink at the left and right ends of the check form 4a remains, the cutting lines 120 may also be read with the MICR line 100, particularly if the range read by the magnetic head 54 is greater than the width of the check 4. If noise caused by the cutting lines 120 is mistakenly extracted as character waveform data, the cutting lines 120 will also be treated as a magnetic ink character 101 and may be identified as a character that cannot be recognized similarly to ink overspray 110.

If noise due to ink overspray 110 or cutting lines 120 is mistakenly extracted as character waveform data, the noise could be wrongly recognized as a magnetic ink character 101 depending upon the difference to the reference waveform data. If such noise is mistakenly extracted as character waveform data, and the difference to the reference waveform data for the number 3, for example, becomes small, the noise may be recognized as the number Character Recognition Process The character recognition process in the check reader 1 according to this embodiment of the invention is described next. The character recognition process in a check reader 1 according to this embodiment is shown in FIG. 6 to FIG. 9. FIG. 10A and FIG. 10B show examples of character waveform data. More specifically, FIG. 10A shows character waveform data for the number 2, and FIG. 10B shows character waveform data for the number 3.

Figure 6:
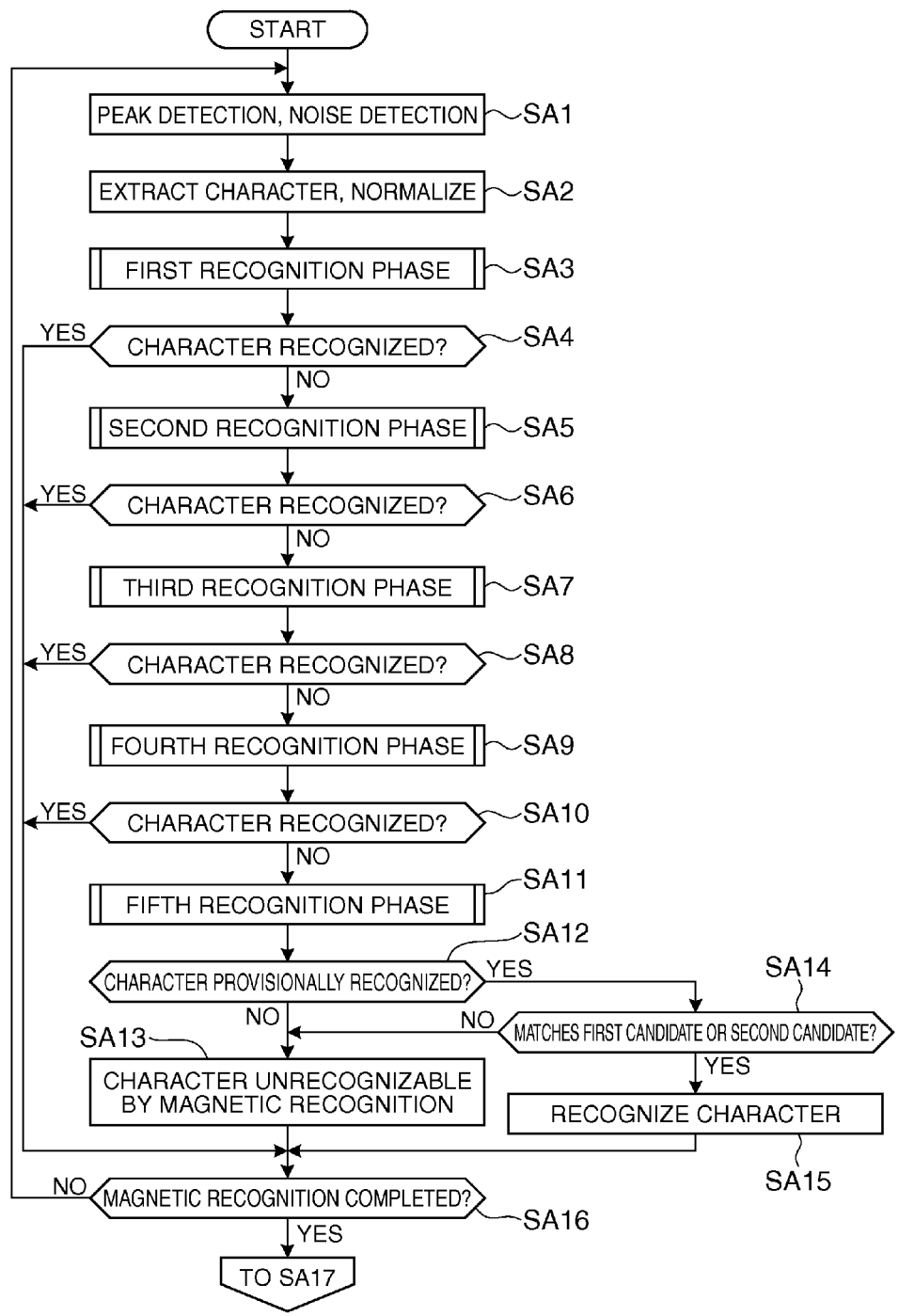
FIG. 6 is a flow chart describing the character recognition process in a check reader according to the invention.

In step SA1 in FIG. 6, the magnetic head 54 magnetically reads the MICR line 100 printed on the front of the check 4, and acquires signal waveform data. The first peak P1 (FIG. 5A) used as the reference for the start character extraction position is then detected in the acquired signal waveform data. In this embodiment, noise is detected after the first peak P1 is detected in step SA1. Noise detection refers to checking if the detected first peak P1 is noise caused by ink overspray 110 or a cutting line 120 (FIG. 1).

While the character waveform data for a magnetic ink character 101 has multiple positive peaks and negative peaks, character waveform data that is noise caused by ink overspray 110 or a cutting line 120 typically only has one positive peak and one negative peak paired with the positive peak. The detected first peak P1 can therefore be determined to be due to noise and not a magnetic ink character 101 if the detected first peak P1 is the only positive peak and plural negative peaks are not detected.

Noise Detection Process (1)

Noise detection in step SA1 is described with reference to FIG. 5A. Noise detection detects if there are positive peaks and negative peaks exceeding the threshold described below within a specific detection range after (right on the x-axis) and before (left on the x-axis) the detected first peak P1. This embodiment first looks for positive and negative peaks after the first peak P1, and if positive and negative peaks are not detected after the first peak P1, looks for positive and negative peaks before the first peak P1.

Why positive and negative peaks are first detected after the first peak P1 because noise is not contained in the signal waveform data more often than noise is contained. As a result, the detected first peak P1 is usually from a magnetic ink character 101, and the likelihood that there are positive and negative peaks after the first peak P1 is high. The processing speed of step SA1 can therefore be increased by detecting peaks after the first peak P1 before detecting peaks before the first peak P1.

A positive peak after the first peak P1 is detected first. The threshold for a positive peak is, for example, the lesser of ½ the level of the detected first peak P1 (L2 in FIG. 5A), and the specific level L1 for detecting the first peak P1. The specific detection range for positive peaks is from 1 mesh after to 6.5 mesh after the first peak P1. If the signal level in this specific detection range is greater than or equal to the positive peak threshold, there is a positive peak other than first peak P1, and the detected first peak P1 can therefore be determined to be from a magnetic ink character 101.

The reason ½ the level of the detected first peak P1 is used as the positive peak threshold is because the level of the second peak P2 could be approximately ½ the level of the first peak P1 as indicated by the character waveform data for the number 2 shown in FIG. 10A. Therefore, if the positive peak threshold is set higher than ½ the level of the first peak P1, the detected first peak P1 may be mistakenly determined to be noise even though the first peak P1 is from a magnetic ink character 101.

The reason the specific detection range for positive peaks is from 1 mesh after to 6.5 mesh after the first peak P1 is because the distance from the first positive peak to the last positive peak in the character waveform data of a magnetic ink character 101 is usually at most approximately 6.5 mesh considering variations in printing. Therefore, if another positive peak is detected in the range following to 6.5 mesh, the detected first peak P1 can be determined to be from a magnetic ink character 101.

Negative peaks following the first peak P1 are detected next. The negative peak threshold is, for example, the lesser of the level of the detected first peak P1, and the specific level L1 for detecting the first peak P1. The specific detection range for negative peaks is 1 mesh after the specific positive peak detection range, that is, from 2 mesh after to 7.5 mesh after the first peak P1. If the absolute value of the signal level on the negative side in this specific search range equals or exceeds the negative peak threshold, there is a negative peak other than the negative peak paired with the first peak P1, and the detected first peak P1 can be determined to be due to a magnetic ink character 101.

The negative peak threshold is referenced to the level of the first peak P1 because the value (absolute value) of a negative peak in the character waveform data of a magnetic ink character 101 is usually approximately equal to or greater than the first peak P1 level. In addition, the negative peak search range goes to 1 mesh after the positive peak search range because the negative peak paired with the first peak P1 is close to the first peak P1, such as approximately 1 mesh after, even when the first peak P1 is noise. Because the negative peak paired with the first peak P1 is not detected if the negative peak search range is one mesh after the positive peak search range, the detected first peak P1 can be determined to be from a magnetic ink character 101 if another negative peak is detected.

If positive and negative peaks are not detected after the first peak P1, a positive peak is detected before the first peak P1. The positive peak threshold is the same as for detecting a positive peak after the first peak P1, and the specific positive peak search range is from 6.5 mesh before to 1 mesh before the first peak P1. If a positive peak is detected in this range, the detected first peak P1 can be determined to be from a magnetic ink character 101.

A negative peak before the first peak P1 is then detected. The negative peak threshold is the same as for detecting a negative peak after the first peak P1, and the specific negative peak search range is 1 mesh after the positive peak search range, that is, from 5.5 mesh before the first peak P1 to the first peak P1. If a negative peak is detected in this range, the detected first peak P1 is determined to be from a magnetic ink character 101.

If the detected first peak P1 is determined to be from a magnetic ink character 101 in the noise detection process described above, control goes to step SA2. However, if the detected first peak P1 is determined to be noise as a result of noise detection, first peak detection continues to find the next first peak P1 following the first peak P1 determined to be noise.

Using the noise detection process described above, this embodiment can thus detect noise caused by ink overspray 110 or cutting line 120 that is mistakenly detected as a first peak P1 in the peak detection process of step SA1. As a result, first peaks P1 caused by a magnetic ink character 101 and not noise can be detected and character waveform data extracted correctly. Mistakenly extracting noise due to ink overspray 110 or cutting line 120 as character waveform data for a magnetic ink character 101 in the following step SA2 can also be suppressed.

Based on the position of the first peak P1 detected in step SA1, the character recognition unit 80 then extracts the character waveform data for one character corresponding to a magnetic ink character 101 from the signal waveform data in step SA2 in FIG. 6. The extracted character waveform data is then normalized.

Magnetic Recognition Process

The magnetic recognition process described from step SA3 below has five recognition phases from a first recognition phase in step SA3 to a fifth recognition phase in step SA11. These five recognition phases apply magnetic recognition to the character waveform data of the target character using different methods.

These five recognition phases are sequentially applied to the character waveform data of the target character extracted in step SA2. If the target character is successfully recognized in any of the first to fourth of the five recognition phases, the next magnetic ink character 101 is made the target character and magnetic recognition is applied to the character waveform data for the new target character without proceeding to the next phase.

If the target character cannot be recognized in these five recognition phases, the optical recognition process described below in step SA23 (FIG. 7) is applied to the target character.

As described above, the shapes of magnetic ink characters 101 printed by offset and laser printing processes may differ slightly. The reference waveform data therefore includes reference waveform data for offset printing, and reference waveform data for laser printing. This embodiment uses the reference waveform data for offset printing in the first and second recognition phases, and uses reference waveform data for laser printing in the third and fourth recognition phases.

In the first recognition phase in step SA3, the character recognition unit 80 detects the difference between the character waveform data for the target character and the reference waveform data for the 14 MICR characters by means of a simple comparison and a sliding comparison. As described above, if the difference between the character waveform data and the reference waveform data of the first candidate character is less than or equal to the threshold, and the difference between the character waveform data and the reference waveform data of the second candidate character is greater than the threshold, recognition of the target character is confirmed.

A simple comparison means simply comparing the waveform of the character waveform data for the target character with the waveform of the reference waveform data. A sliding comparison means sliding the waveform of the character waveform data for the target character and the waveform of the reference waveform data a specific distance (sampling unit) in a specific range for comparison. If the target character is recognized as a result of the simple comparison, the first recognition phase ends without applying the sliding comparison.

In the next step SA4, the character recognition unit 80 determines if the target character was recognized in the first recognition phase in step SA3. If the target character was recognized (step SA4 returns YES), the character recognition unit 80 skips the second recognition phase and goes directly to step SA16. If the target character was not recognized (step SA4 returns NO), the second recognition phase executes in step SA5.

In the second recognition phase in step SA5, the character recognition unit 80 scales the waveform of the reference waveform data for the character being compared, and detects the difference between the corrected reference waveform data and the waveform of the character waveform data for the target character.

In the second recognition phase, if the difference between the character waveform data and the reference waveform data of the first candidate is less than or equal to the threshold, and the difference between the character waveform data and the reference waveform data of the second candidate is greater than the threshold, the character recognition unit 80 determines that the target character was recognized.

In the next step SA6, the character recognition unit 80 determines if the target character was recognized in the second recognition phase in step SA5. If the target character was recognized (step SA6 returns YES), the character recognition unit 80 skips the third recognition phase and goes directly to step SA16. If the target character was not recognized (step SA6 returns NO), the third recognition phase executes in step SA7.

The reference waveform data for laser printing is used in the third recognition phase in step SA7, operation is the same as in the first recognition phase in step SA3, and further description thereof is thus omitted.

In the next step SA8, the character recognition unit 80 determines if the target character was recognized in the third recognition phase in step SA7, goes directly to step SA16 if the target character was recognized (step SA8 returns YES), and executes the fourth recognition phase in step SA9 if the target character was not recognized (step SA8 returns NO).

The reference waveform data for laser printing is used in the fourth recognition phase in step SA9, operation is the same as in the second recognition phase in step SA5, and further description thereof is thus omitted.

In the next step SA10, the character recognition unit 80 determines if the target character was recognized in the fourth recognition phase in step SA9, goes directly to step SA16 if the target character was recognized (step SA10 returns YES), and executes the fifth recognition phase in step SA11 if the target character was not recognized (step SA10 returns NO).

Instead of comparing all sampling units, the fifth recognition phase in step SA11 compares the waveform of the target character waveform data and the waveform of the reference waveform data at the positions of the peaks and the sampling units therebefore and after in the reference waveform data. This eliminates the effect of disturbance in the waveform of the character waveform data of the target character, and enables recognizing the target character with consideration for stretching, compression, and shifting in parts of the waveform.

The fifth recognition phase does not confirm recognition of the target character as in the other recognition phases, and recognition of the target character is confirmed only if a specific condition is met as described below. Confirmation of target character recognition in the fifth recognition phase is therefore referred to as "provisional confirmation" below. This is because while the other recognition phases recognize magnetic ink characters using the difference in all sampling units, the fifth recognition phase recognizes magnetic ink characters using the results of comparing the waveform of the character waveform data and the waveform of the reference waveform data in specific sampling units.

In the next step SA12, the character recognition unit 80 determines if the target character was provisionally recognized in the fifth recognition phase. If recognition of the target character was not provisionally confirmed (step SA12 returns NO), that is, if the target character could not be recognized in any of the first to fifth recognition phases, the character recognition unit 80 determines that the target character cannot be recognized by magnetic recognition (step SA13), and goes to step SA16.

If recognition of the target character is provisionally confirmed in the fifth recognition phase (step SAl2 returns YES), the character recognition unit 80 determines if there is a match between the character provisionally confirmed in the fifth recognition phase and the character used as the first or second candidate character in the preceding recognition phases (step SA14). Whether there is a match between the character provisionally confirmed in the fifth recognition phase and either the first or second candidate character in the second recognition phase is determined in this example.

If the characters do not match (step SA14 returns NO), the character recognition unit 80 determines that the target character cannot be recognized by magnetic recognition (step SA13), and goes to step SA16. If there is a match (step SA14 returns YES), the character recognition unit 80 confirms that the target character is the character that was provisionally confirmed in the fifth recognition phase (step SA15), and goes to step SA16.

In step SA16, the character recognition unit 80 determines if the magnetic recognition process completed, that is, if all magnetic ink characters 101 in the MICR line 100 were processed as the target character. If the magnetic recognition process completed (step SA16 returns YES), the character recognition unit 80 goes to step SA17 in FIG. 7. If the magnetic recognition process is not completed (step SA16 returns NO), the character recognition unit 80 returns to step SA1.

Noise Detection Process (2)

Figure 7:
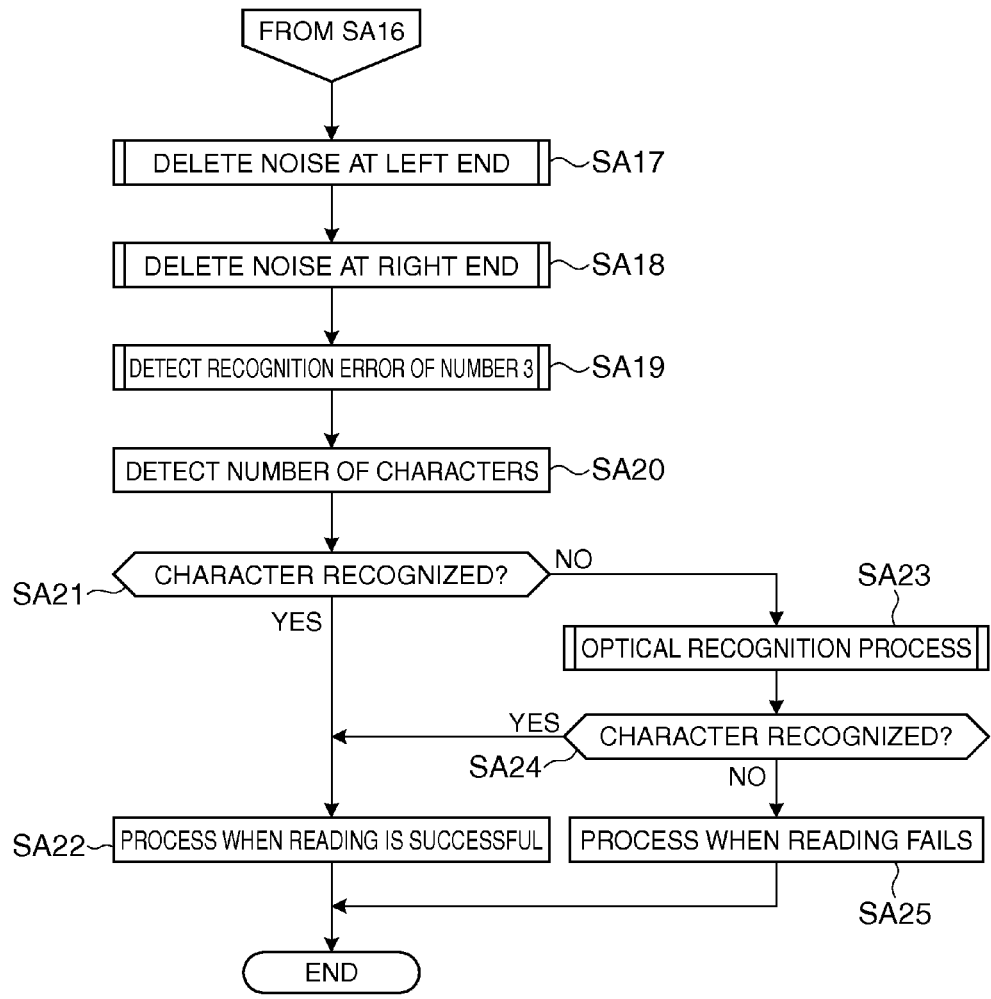
FIG. 7 is a flow chart describing the character recognition process in a check reader according to the invention.

The three processes in step SA17 to step SA19 in FIG. 7 handle problems that can occur when noise due to ink overspray 110 or cutting line 120 is not detected by the noise detection operation in step SA1, and the noise is mistakenly extracted in the character waveform data of the target character in step SA2. More specifically, these steps detect noise that is mistakenly processed as a character in the recognition string obtained from magnetic recognition, and remove the noise and correct the recognition error.

If noise due to ink overspray 110 or cutting line 120 is mistakenly processed as a character, that character (noise) may be mistakenly recognized as the number 3. That character (noise) is also often at a position separated from the other characters in the recognition string obtained by magnetic recognition. The possibility is therefore high that a character standing alone at the left end or right end of the recognition string is noise caused by ink overspray 110 or cutting line 120 near the left end or right end of the check form 4a. Step SA17 and step SA18 therefore confirm if a lone target character at the left end or right end is noise.

In step SA17, the character recognition unit 80 determines if the character at the left end of the recognition string obtained by magnetic recognition is noise due to ink overspray 110 or cutting line 120. If the left-end character is determined to be noise, that left-end character (noise) is deleted, for example. The operation of step SA17 is described next with reference to FIG. 8.

Figure 8:
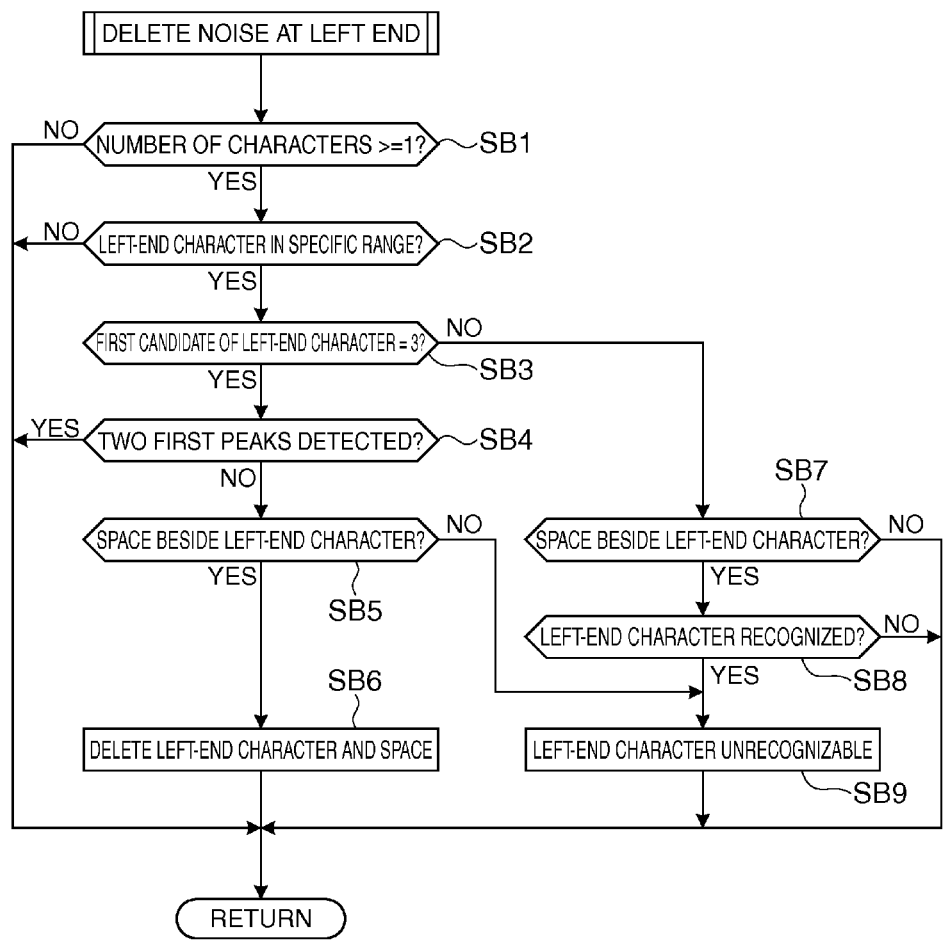
FIG. 8 is a flow chart describing the character recognition process in a check reader according to the invention.

In step SB1 in FIG. 8, the character recognition unit 80 determines if the number of recognized characters in the recognition string acquired by magnetic recognition is 1 or more. If the number of recognized characters is 1 or more (step SB1 returns YES), the character recognition unit 80 goes to step SB2. If the number of recognized characters is 0 (step SB1 returns NO), the process of step SA17 ends.

In step SB2, the character recognition unit 80 determines if the location of the character at the left end, including unrecognized characters in the recognition string, is within a specific range. More specifically, the character recognition unit 80 determines if the first peak P1 detected as the leading peak in the signal waveform data obtained by reading the MICR line 100 is, for example, within the specific range of 4 mesh plus 6 mm from the right end of the signal waveform data.

In a typical MICR line 100, the first peak P1 in the signal waveform data is before the range of 4 mesh from the position in the signal waveform data corresponding to the left end of the check 4. The first peak P1 being within the range of 4 mesh from the signal waveform data corresponding to the left end of the check 4 therefore means that the first peak P1 is closer than usual to the left end of the check 4. More specifically, the first peak P1 may be due to noise at the left end of the check 4.

As described above, the area that is read by the magnetic head 54 may be set wider than the width of the check 4 to accommodate variations in the detection precision of the paper length detector 61 and the conveyance speed through the conveyance path 5. The range read by the magnetic head 54 may be set an amount A wider on both sides than the width of the check 4 as shown in FIG. 1, and in this embodiment A is 3 mm. Distance A is the detection error of the paper length detector 61, and the detection error is +/−A. This means that the reading range of the magnetic head 54 may be a maximum 6 mm outside the edge of the check 4 on one side, and the specific range is therefore the above 4 mesh plus 6 mm. Note that 1 mesh is equal to 0.33 mm.

If in step SB2 the position of the character at the left end is in this specific range (step SB2 returns YES), the character recognition unit 80 goes to step SB3. If the position of the character at the left end is not in this specific range (step SB2 returns NO), the process of step SA17 ends.

In step SB3, whether the character used as the first candidate of the left-end character is the number 3 is determined. As described above, regardless of whether recognition was successful in the magnetic recognition process, the left-end character could be mistakenly recognized noise when the first candidate character is the number 3. As a result, whether the left-end character is noise or not is determined further if the first candidate character is the number 3.

If the first candidate character of the left-end character is the number 3 (step SB3 returns YES), the character recognition unit 80 goes to step SB4. If the first candidate character of the left-end character is not the number 3 (step SB3 returns NO), the character recognition unit 80 goes to step SB7.

Whether the left-end character begins with two peaks is determined in step SB4. As shown in FIG. 10B, there are two consecutive positive peaks, first peak P1 and second peak P2, at the beginning of the character waveform data for the number 3. That there are two peaks at the beginning thus indicates there are two consecutive positive peaks at the beginning. If the first candidate for the left-end character is 3 in step SB3, and there are not two peaks at the beginning of the character waveform data for the left-end character, the left-end character does not have this feature of character waveform data for the number 3, and the likelihood is high that the left-end character is noise that was recognized in error.

If the signal level 1 mesh after or 1 mesh before the detected first peak P1 exceeds ½ the level of the first peak P1, the character recognition unit 80 determines there are two peaks at the beginning. This accommodates the level of one of the two positive peaks at the beginning being lower than normal due to waveform clipping.

If the left-end character does not start with two peaks (step SB4 returns NO), the character recognition unit 80 goes to step SB5. If the left-end character starts with two peaks (step SB4 returns YES), the process of step SA17 ends.

Whether there is a space on the right adjacent to the left-end character is determined in step SB5. That there is a space on the right adjacent to the left-end character means that the left-end character is alone separated from the other characters. The likelihood is therefore high that the left-end character is at a position separated from the MICR line 100, and is noise due to ink overspray 110 or cutting line 120 near the left end of the check 4.

If there is a space on the right adjacent to the left-end character (step SB5 returns YES), the character recognition unit 80 goes to step SB6. If there is not a space on the right adjacent to the left-end character (step SB5 returns NO), the process goes to step SB9.

The left-end character and space on the right side are then deleted in step SB6. The target character for which the first candidate is 3 does not have the feature of character waveform data for the number 3, and is alone at the left end of the recognition string, and the likelihood that the target character is noise is extremely high. The target character at the left end is therefore determined to be noise and deleted.

The space on the right beside the left-end character that is deleted is also determined to not be a space character 103 that delimits fields 102 because a space character 103 is not found at the end of the MICR line 100 (recognition string) as shown in FIG. 1. The space on the right beside the left-end character is therefore deleted together with the left-end character in step SB6. The process of step SA17 then ends, and control goes to step SA18 (FIG. 7).

Whether there is a space on the right adjacent to the left-end character is determined in step SB7 when step SB3 determines the first candidate of the left-end character is not 3. That there is a space on the right adjacent to the left-end character means that the likelihood is high that the left-end character is noise at a position separated from the MICR line 100 even though the first candidate is not 3.

If there is a space on the right adjacent to the left-end character (step SB7 returns YES), the character recognition unit 80 goes to step SB8. If there is not a space on the right adjacent to the left-end character (step SB7 returns NO), the process of step SA17 ends.

Whether the left-end character was recognized in the magnetic recognition process is determined in step SB8. If there is a space on the right even though the left-end character is recognized as a character other than 3, the left-end character may be noise and the recognized character may be an error. However, because the left-end character was recognized based on the threshold values in the magnetic recognition process, it may not be noise. The left-end character is therefore preferably not deleted and considered unrecognizable to avoid a recognition error.

If the left-end character is recognized in the magnetic recognition process (step SB8 returns YES), the character recognition unit 80 goes to step SB9, and flags the left-end character as unrecognizable in step SB9. Steps SA17 then ends, and control goes to step SA18.

However, if the left-end character was not recognized in the magnetic recognition process (step SB8 returns NO), step SA17 ends and control goes to step SA18.

The character recognition unit 80 executes step SA18 in FIG. 7 next. In step SA18 the character recognition unit 80 determines if the character at the right end of the recognition string obtained by magnetic recognition is noise due to ink overspray 110 or cutting line 120. If the right-end character is determined to be noise, the character recognition unit 80 deletes the right-end character (noise), for example.

Except for substituting the right end for the left end, the steps executed in the process of step SA18 are the same as in step SA17, and further description thereof is thus omitted.

The character recognition unit 80 then executes the recognition error detection process of step SA19 in FIG. 7. In step SA19 the character recognition unit 80 determines if a character recognized as the number 3 by magnetic recognition is the result of a recognition error of noise due to ink overspray 110 or cutting line 120. Ink overspray 110 can be found at any position, and is not limited to the left or right ends of the check 4. More specifically, if noise due to ink overspray 110 is mistakenly recognized as a character, that character (noise) is not limited to the left or right ends of the recognition string.

If a character recognized as the number 3 is found anywhere in the recognition string at a position separated from the other characters, and not only at the left end or the right end, the character recognition unit 80 determines in step SA19 if that character is noise. If the character is determined to be noise mistakenly recognized as a 3, the character is processed as unrecognizable. The process of step SA19 is described below with reference to FIG. 9.

Figure 9:
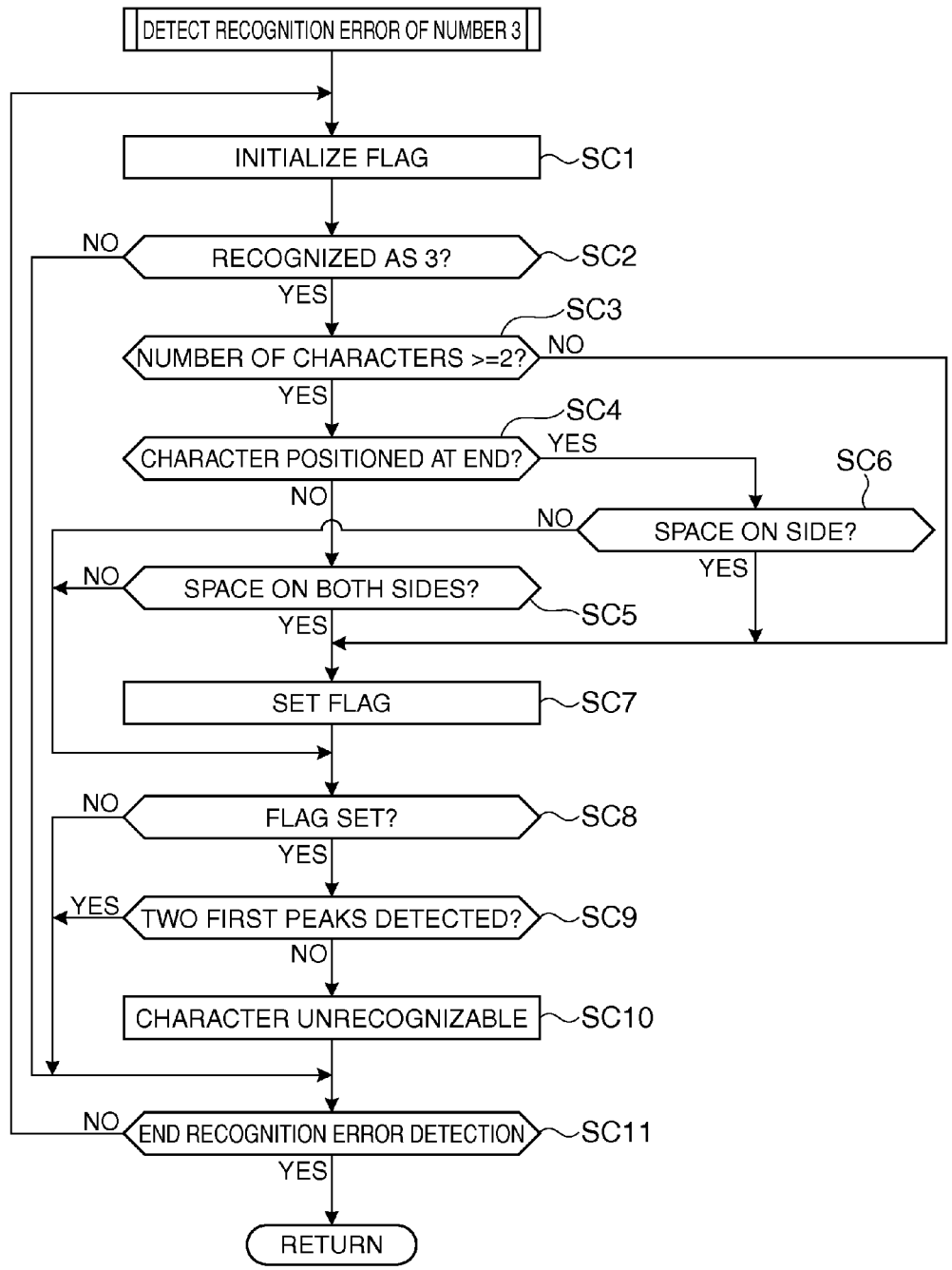
FIG. 9 is a flow chart describing the character recognition process in a check reader according to the invention.
Figure 10A:
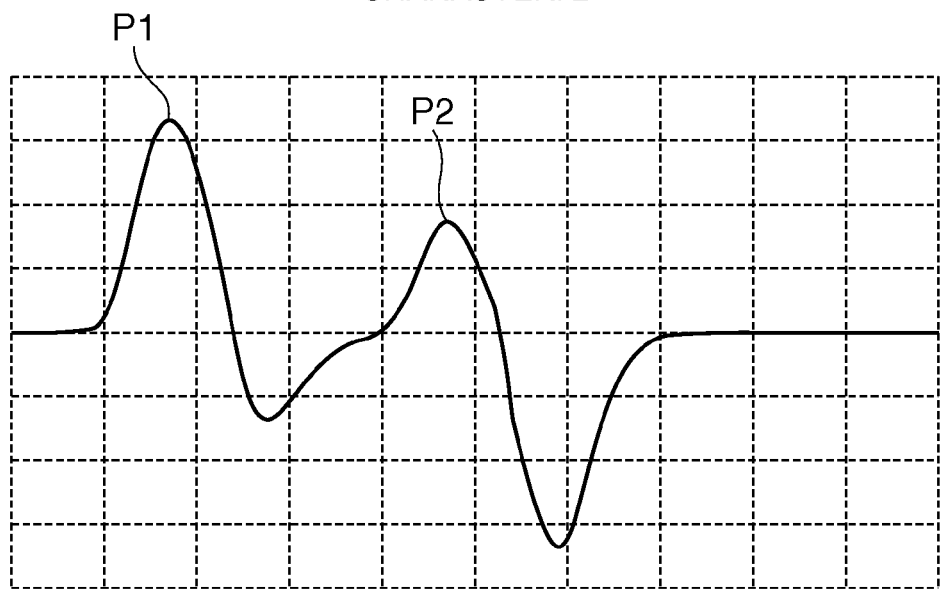
FIG. 10A and FIG. 10B show examples of character waveform data.
Figure 10B:
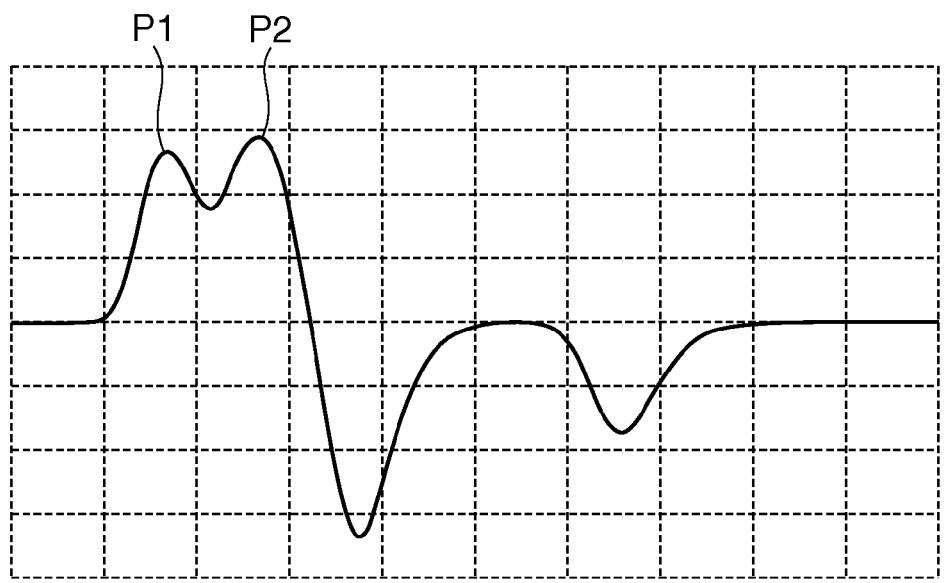

At step SC1, in FIG. 9 the character recognition unit 80 initializes and set a flag to 0. This flag is set to 1 if the character recognized as a 3 is determined to possibly be the result of a recognition error of noise. The flag is therefore reset to 0 for each target character.

In step SC2, the character recognition unit 80 determines if the target character was recognized as the number 3. If the character was recognized as a 3 (step SC2 returns YES), the character recognition unit 80 goes to step SC3. If the character was not recognized as a 3 (step SC2 returns NO), verification of the character is not necessary and control goes directly to step SC11, skipping step SC3 to step SC10.

In step SC3, the character recognition unit 80 determines if the number of characters recognized in the recognition string is 2 or more. If the number of recognized characters is 2 or more (step SC3 returns YES), the character recognition unit 80 goes to step SC4. If the number of recognized characters is 1 (step SC3 returns NO), that is, if the single recognized character is a 3, the target character may possibly be determined to be a noise recognition error, and control goes to step SC7. In step SC7 the flag is set to 1.

In step SC4, the character recognition unit 80 determines if the target character is located at an end of the recognition string. If the position in the recognition string is an end (step SC4 returns YES), the character recognition unit 80 goes to step SC6.

In step SC6, the character recognition unit 80 determines if there is a space beside the target character. If a space is beside the target character (step SC6 returns YES), the character recognition unit 80 determines that the target character is separated from the other characters and may possibly be a noise recognition error, and therefore goes to step SC7 and sets the flag to 1. If a space is not beside the target character (step SC6 returns NO), the character recognition unit 80 goes to step SC8.

If the character recognition unit 80 determines in step SC4 that the position in the recognition string is not an end (step SC4 returns NO), the character recognition unit 80 goes to step SC5.

In step SC5, the character recognition unit 80 determines if there is a space on both sides of the target character. If there is a space on both sides of the target character (step SC5 returns YES), the character recognition unit 80 determines that the target character is separated from the other characters and may possibly be a noise recognition error, and therefore goes to step SC7 and sets the flag to 1. If a space is not on both sides of the target character (step SC5 returns NO), the character recognition unit 80 goes to step SC8.

In step SC8, the character recognition unit 80 determines if the flag was set to 1. If the flag was set to 1 (step SC8 returns YES), the character recognition unit 80 goes to step SC9. If the flag was not set to 1 (step SC8 returns NO), the character recognition unit 80 determines the target character is not noise and goes to step SC11.

In step SC9, the character recognition unit 80 determines if the target character starts with two peaks, that is, has the feature of character waveform data for the number 3. If there are not two peaks at the beginning (step SC9 returns NO), the character recognition unit 80 goes to step SC10.

In step SC10, the target character is separated from the other characters in the recognition string and does not have the feature of the character waveform data for the number 3, the likelihood that noise was mistakenly recognized as the number 3 is therefore high, and the character recognition unit 80 determines that the target character is unrecognizable. However, this target character was recognized by a magnetic recognition process, a different character could possibly have been mistakenly recognized as a 3, and the target character is therefore not deleted.

However, if the target character starts with two peaks (step SC9 returns YES), the character recognition unit 80 goes to step SC11 because the target character has a feature of the character waveform data for the number 3 and may not be noise.

In step SC11, the character recognition unit 80 determines if the recognition error detection process was completed for all characters in the recognition string. If the recognition error detection process was completed for all characters (step SC11 returns YES), the character recognition unit 80 goes to step SA20 in FIG. 7. If the recognition error detection process was not completed for all characters (step SC11 returns NO), the character recognition unit 80 returns to step SC1.

When noise due to ink overspray 110 or cutting line 120 is mistakenly extracted as character waveform data in the magnetic recognition process, the three processes described in step SA17 to step SA19 can detect and remove the noise from the recognition string acquired by the magnetic recognition process and correct recognition errors.

Returning to FIG. 7, the character recognition unit 80 detects the number of characters in the recognition string in step SA20. In step SA21, the character recognition unit 80 determines if all characters contained in the recognition string, that is, all magnetic ink characters 101 in the MICR line 100, were recognized.

If all characters were recognized (step SA21 returns YES), the host-side control unit 73 determines that reading the MICR line 100 was successful and in step SA22 executes the process that is performed when the MICR line 100 is successfully read. The process performed when the MICR line 100 is successfully read includes, for example, storing the information indicated by the MICR line 100 in a storage unit, recording a specific endorsement image on the back of the check 4 with a printer or other recording device, and discharging the check 4 from the check reader 1.

However, if there is even only one character in the recognition string that could not be recognized (step SA21 returns NO), the character recognition unit 80 executes the optical recognition process in step SA23 to optically recognize target characters not recognized by magnetic recognition.

In the optical recognition process of step SA23, the character recognition unit 80 identifies the range of data corresponding to an image of the MICR line 100 in the data for the image of the check 4 front captured by the front contact image sensor 52, and extracts image data for each magnetic ink character 101. The character recognition unit 80 then optically recognizes the characters by comparing bitmap patterns for each of the 14 MICR characters with the extracted image data, and recognizes each of the magnetic ink characters 101.

The optical recognition process in step SA23 may recognize a target character that was not recognized in the magnetic recognition process based on the result of optical recognition, or provisionally recognize the character based on the result of optical recognition and confirm recognition if the provisionally recognized character matches the first candidate or second candidate used in the magnetic recognition process.

In step SA24, the character recognition unit 80 determines if all magnetic ink characters 101 that were not recognized by magnetic recognition were recognized by the optical recognition process in step SA23. If all magnetic ink characters 101 are recognized (step SA24 returns YES), the character recognition unit 80 executes the operation performed in step SA22 when the MICR line 100 is successfully read.

However, if there is even only one magnetic ink character that could not be recognized (step SA24 returns NO), the host-side control unit 73 executes the operation performed in step SA25 when reading the MICR line 100 fails. The operation performed in step SA25 when reading the MICR line 100 fails discharges the check 4 without printing an endorsement image, for example. The discharged check 4 is then examined to determine why reading failed, or is read again, for example.

The character recognition process of the check reader 1 according to this embodiment of the invention ends as described above.

The effect of a recording media processing device, control method of a recording media processing device, and computer-readable recording medium according to the invention as described above is described below.

(1) When there is a space beside one character located at an end of the recognition string, the possibility is high that noise due to ink overspray 110 or cutting line 120 separated from the MICR line 100 near an end of the check 4 was mistakenly recognized as a character. When there is a space on both sides of a single character in the recognition string, the possibility is high that noise due to isolated ink overspray in the MICR line 100 was mistakenly recognized as a character. The check reader 1 can check if such characters are noise, and thereby determine that noise due to ink overspray 110 or cutting line 120 is an unrecognizable character, and suppress mistakenly recognizing such noise as a character. The recognition rate can therefore be improved and recognition errors suppressed.

(2) When noise is mistakenly recognized as a character, the noise is sometimes erroneously recognized as the number 3. The character waveform data for the number 3 starts with two peaks, first peak P1 and second peak P2. Therefore, when a character located with an adjacent space at an end of the recognition string, or a character with a space on both sides, is recognized as the number 3, and that character does not have two peaks at the beginning of the waveform, the possibility is extremely high the character is noise that was recognized in error. Because such characters can be identified as noise, the check reader 1 can determine that noise due to ink overspray or cutting line is an unrecognizable character, and suppress mistakenly recognizing such noise as a character.

(3) Character waveform data for magnetic ink characters 101 have plural peaks exceeding a specific level. Therefore, when a peak exceeding this specific level is not detected within a specific period before or after the first peak P1, the possibility that the first peak P1 is not from a magnetic ink character 101 but is noise due to ink overspray 110 or cutting line 120 is extremely high. Because the check reader 1 determines the first peak P1 is noise in this event, the check reader 1 can repeat detecting the first peak P1 of the magnetic ink character 101, and can correctly extract character waveform data in step SA2.

(4) Checks 4 are usually free of ink overspray 110 and cutting lines 120, and finding ink overspray 110 or a cutting line 120 on a check 4 is the exception. Character waveform data for magnetic ink characters 101 also has peaks exceeding the specific threshold level after the first peak P1. The check reader 1 first detects a peak in a specific range after the first peak P1, and processing is therefore faster than when peaks are first detected before the first peak P1.

A preferred embodiment of the invention is described above, but the invention is not limited thereto and can obviously be modified and adapted as desired within the scope of the invention.

For example, noise detection in the foregoing embodiment determines if there are two peaks at the beginning of the waveform based on the signal level of the character waveform data, but the invention is not so limited. For example, the noise detection process could be based on the waveform shape (first peak) instead of the signal level of the character waveform data. This embodiment enables evaluating noise more accurately.

The magnetic recognition process has five magnetic recognition phases in the embodiment described above, but the invention is not so limited. The magnetic recognition process does not need to have all magnetic recognition phases, and embodiments having only the first recognition phase and second recognition phase, or only the third recognition phase and fourth recognition phase, are conceivable. The recognition phases can be selectively applied based on the type of magnetic ink or the recognition rate of the magnetic recognition process, for example.

The foregoing embodiment includes an optical recognition process, but the invention is not so limited. The optical recognition process may be omitted when a desired recognition rate is achieved in the magnetic recognition phase.

The functions of parts of the check reader 1 and the control method of the check reader 1 described in the foregoing embodiment can also be achieved by storing all or part of the foregoing program on a floppy disk, Compact Disc, flash ROM, or other storage medium, and installing the program therefrom to a personal computer, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording media processing device comprising:
a magnetic reading unit that magnetically reads a magnetic ink character line recorded on a recording medium; and
a character recognition unit that detects a first peak in signal waveform data acquired by the magnetic reading unit reading the magnetic ink character line,
extracts character waveform data from the signal waveform data in an area corresponding to one magnetic ink character contained in the magnetic ink character line based on the position of the detected first peak,
applies a magnetic recognition process to the extracted character waveform data to recognize the magnetic ink character,
acquires a recognition string corresponding to the magnetic ink character line, and
when the first peak in the character waveform data of a target character located at an end of the recognition string is within a specific range from an end of the character waveform data and a space is beside the target character, or when a space is on both sides of the target character in the recognition string, determines if the target character is noise.

2. The recording media processing device described in claim 1, wherein:
the character recognition unit determines if there are two first peaks in the character waveform data of the target character when the target character is recognized as the number 3, and
determines the target character is noise if there are not two first peaks in the character waveform data of the target character.

3. The recording media processing device described in claim 1, wherein:
the character recognition unit detects a peak before and after the first peak in the signal waveform data, and
determines the first peak is noise if a peak equal to or exceeding a specific level is not detected within a specific range before and after the first peak.

4. The recording media processing device described in claim 3, wherein:

the character recognition unit first detects a peak equal to or exceeding the specific level on the side after the first peak in the reading direction.

5. A control method of a recording media processing device having a magnetic reading unit that magnetically reads a magnetic ink character line recorded on a recording medium, and a character recognition unit that detects a first peak in signal waveform data acquired by the magnetic reading unit reading the magnetic ink character line, extracts character waveform data from the signal waveform data in an area corresponding to one magnetic ink character contained in the magnetic ink character line based on the position of the detected first peak, applies a magnetic recognition process to the extracted character waveform data to recognize the magnetic ink character, and acquires a recognition string corresponding to the magnetic ink character line, the control method comprising a step of:

the character recognition unit determining if the target character is noise when the first peak in the character waveform data of a target character located at an end of the recognition string is within a specific range from an end of the character waveform data and a space is beside the target character, or when a space is on both sides of the target character in the recognition string.

6. The control method of a recording media processing device described in claim 5, wherein:

the step of determining if the target character is noise determines if there are two first peaks in the character waveform data of the target character when the target character is recognized as the number 3, and determines the target character is noise if there are not two first peaks in the character waveform data of the target character.

7. The control method of a recording media processing device described in claim 5, wherein:

the step of determining if the target character is noise detects a peak before and after the first peak in the signal waveform data, and determines the first peak is noise if a peak equal to or exceeding a specific level is not detected within a specific range before and after the first peak.

8. The control method of a recording media processing device described in claim 7, wherein:

the step of determining if the target character is noise first detects a peak equal to or exceeding the specific level on the side after the first peak in the reading direction.

9. A Non-transitory computer-readable recording medium storing a program executed by a control unit that controls parts of a recording media processing device having a magnetic reading unit that magnetically reads a magnetic ink character line recorded on a recording medium, and a character recognition unit that detects a first peak in signal waveform data acquired by the magnetic reading unit reading the magnetic ink character line, extracts character waveform data from the signal waveform data in an area corresponding to one magnetic ink character contained in the magnetic ink character line based on the position of the detected first peak, applies a magnetic recognition process to the extracted character waveform data to recognize the magnetic ink character, and acquires a recognition string corresponding to the magnetic ink character line, the program causing the control unit to execute a step of: determining if the target character is noise when the first peak in the character waveform data of a target character located at an end of the recognition string is within a specific range from an end of the character waveform data and a space is beside the target character, or when a space is on both sides of the target character in the recognition string.

* * * * *